United States Patent [19]

Kurihara

[11] Patent Number: 4,691,883
[45] Date of Patent: Sep. 8, 1987

[54] DEVICE FOR HOLDING ROD-LIKE OBJECTS

[75] Inventor: Kazumasa Kurihara, Yokohama, Japan

[73] Assignee: Nifco Inc., Yokohama, Japan

[21] Appl. No.: 890,868

[22] Filed: Jul. 28, 1986

[30] Foreign Application Priority Data

Aug. 8, 1985 [JP] Japan .............................. 60-122447

[51] Int. Cl.⁴ ............................................ F16L 3/10
[52] U.S. Cl. .................................. 248/74.2; 248/73; 248/68.1
[58] Field of Search .................... 248/74.2, 74.5, 74.1, 248/68.1, 69, 49, 60, 62, 71, 73; 24/16 PB; 174/40 CC:175

[56] References Cited

U.S. PATENT DOCUMENTS

| | | | |
|---|---|---|---|
| 3,253,084 | 5/1966 | Taylor | 248/74.2 |
| 3,917,202 | 11/1975 | Reinwall | 248/68.1 |
| 4,029,277 | 6/1977 | Bulanda | 248/74.1 |
| 4,131,258 | 12/1978 | Okuda | 248/74.2 |
| 4,195,807 | 4/1980 | Lluage | 248/74.2 |
| 4,295,618 | 10/1981 | Morota | 248/74.3 |
| 4,484,378 | 11/1984 | Kimura | 248/74.3 |
| 4,550,891 | 11/1985 | Schaty | 248/68.1 |

Primary Examiner—Reinaldo P. Machado
Assistant Examiner—Alvin Chin-Shue
Attorney, Agent, or Firm—Trexler, Bushnell, Giangiorgi & Blackstone, Ltd.

[57] ABSTRACT

A device for holding a rod-like object comprises a base portion, a lock portion projecting from one side of said base portion and a holding arm section projecting from the other side and having a receiving recess for fitting a rod-like object therein in a direction perpendicular to the lengthwise direction of the object. The holding arm section is provided with an engagement portion for engaging with the rod-like object fitted in the receiving recess with an elastic restoring force.

3 Claims, 9 Drawing Figures

DEVICE FOR HOLDING ROD-LIKE OBJECTS

FIELD OF THE INVENTION AND RELATED ART STATEMENT

This invention relates to a device for holding a rod-like object such as a rod used for a door lock mechanism of an automobile such that the object is movable in the lengthwise direction thereof.

An automobile door is provided with an inner rod along a door inner panel, the rod being coupled to a door handle or a lock knob to operate a door lock mechanism. The rod has its intermediate portion supported by a holding device which is secured to the door inner panel to minimize vibration of the rod during running of the automobile.

Such a rod undergoes a slight angular change while it is moved in its lengthwise direction with the operation of the door handle or lock knob. The prior art holding device, therefore, has a structure such that it can hold the rod without preventing its movements in the lengthwise direction and angular direction.

FIG. 1 shows a prior art holding device 1.

In the Figure, the holding device 1 illustrated is a plastic integral molding. The device comprises a base portion 2 which is provided on one side with a lock portion 3 and on the other side with two holding arm pairs each consisting of a pair of holding arm portions 4a and 4b having a semi-circular shape and capable of slight elastic deformation.

With this holding device 1, the lock portion 3 is fitted in a mounting hole (not shown) formed in an automobile door inner panel, and rods R are each pressure fitted in between holding arm portions 4a and 4b of each pair from between the free ends of the holding arm portions. Therefore, the operation of a door handle or a lock knob simultaneously causes a movement of the rod R in the lengthwise direction thereof through the holding arm portions 4a and 4b and a slight rotation of the holding device 1 in accordance with an angular movement of the rod R.

With this prior art holding device 1, however, the rod R cannot be firmly clamped between the holding arm portions 4a and 4b because it is necessary to permit easy movement of the rod R in the lengthwise direction. In addition, the holding arm portions 4a and 4b have a small width.

For this reason, when the automobile vibrates strongly during running, the rod R produces a rattling noise that is unpleasant to the ears because it is not firmly clamped between the holding arm portions 4a and 4b.

OBJECT AND SUMMARY OF THE INVENTION

The object of the invention is to provide a device for holding a rod-like object, which has a structure such that the supported rod-like object can be easily moved in the lengthwise direction while it is free from rattling noise due to vibration.

With the device for holding a rod-like object according to the invention, holding arm portions are provided with a damper so that the rod-like object can be held in between the holding arm portions by the damper. The holding arm portions and damper provide holding forces acting in a direction substantially perpendicular to the lengthwise direction of the object. It is thus possible to hold the rod-like object so as to permit movement thereof in the lengthwise direction and also suppress rattling noise due to vibration.

The above and other objects and features of the invention will become more apparent from the following detailed description with reference to the accompanying drawings.

DETAILED DESCRIPTION OF THE PREFERRED EMBODIMENTS

Figure 1:
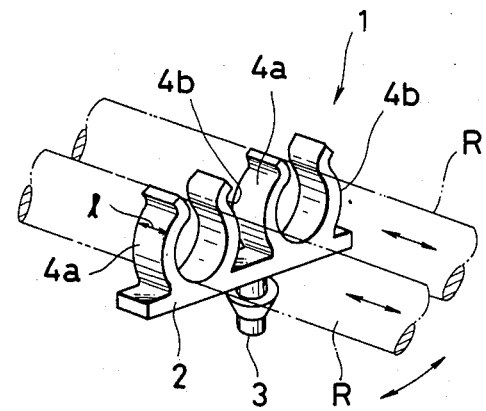
FIG. 1 is a perspective view showing a prior art device for holding a rod-like object.
Figure 2:
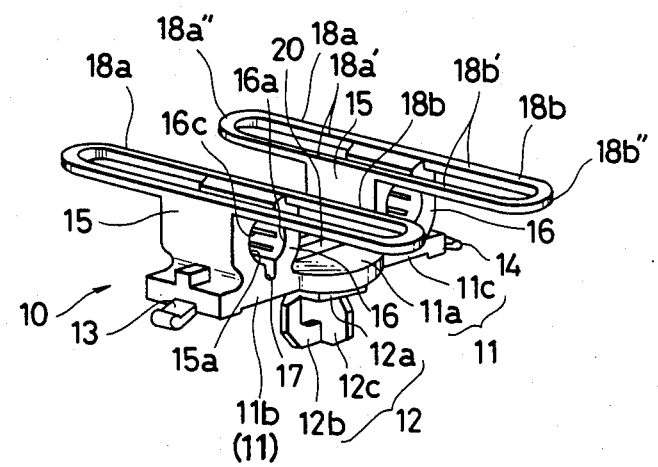
FIG. 2 is a perspective view showing an embodiment of the device for holding a rod-like object according to the invention.
Figure 3A:
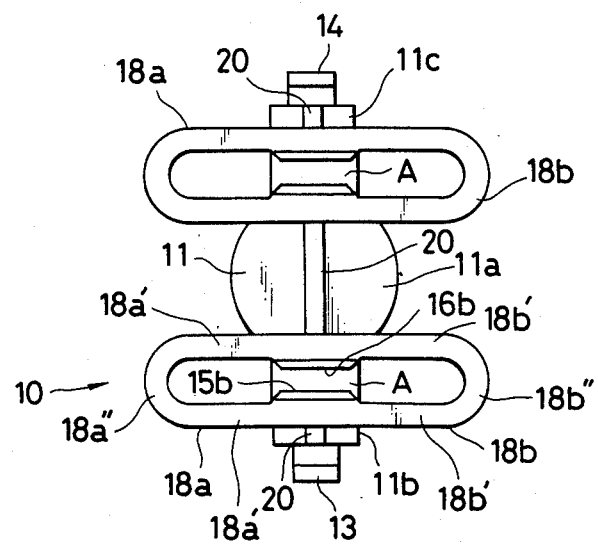
FIG. 3(A) is a plan view showing the device shown in FIG. 2.

FIGS. 2 and 3 illustrate an embodiment of the device for holding a rod-like object according to the invention. Referring to the Figures, reference numeral 10 designates the holding device, which is a one-piece plastic molding. The device comprises a base portion 11 which has a central disk-like portion 11a and rectangular side portions 11b and 11c extending from the opposite sides of the central disk-like portion 11a. The base portion 11 has a lock portion 12 projecting from one side.

The lock portion 12 consists of crossing lock portions 12b and 12c depending from the lower surface (in FIG. 2) of a plate-like stem portion 12a. The plate-like stem portion 12a has a rectangular or square shape which is of smaller dimensions than a rectangular or square mounting hole P1 formed in an inner panel P (FIG. 4) so that a certain amount of play is provided when it is inserted in the mounting hole P1.

Figure 3B:
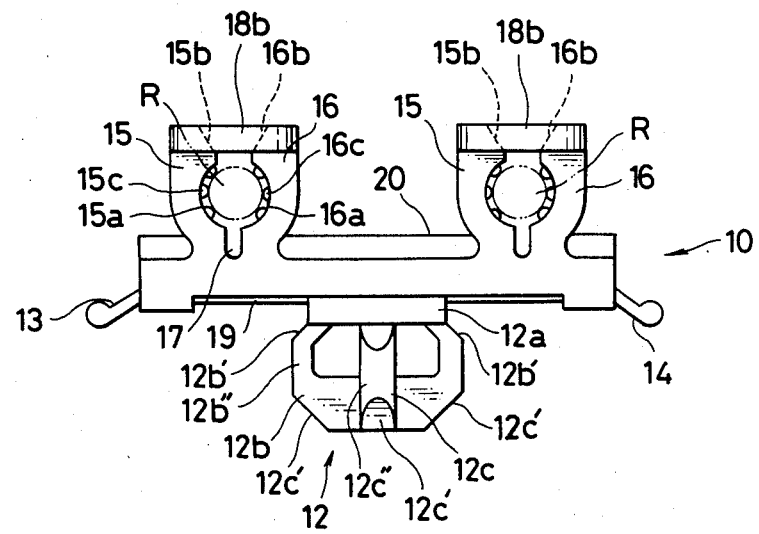
FIG. 3(B) is a side view showing the device shown in FIG. 2.

The crossing lock portions 12b and 12c have taper portions 12b' and 12c' adjacent respectively to the plate-like stem portion 12a and to the free end so that they have outwardly projecting central portions 12b'' and 12c''. The central portions 12b'' and 12c'', as shown in FIG. 3(B), project like a sidewise hill on each side. The dimension of the crossing lock portions 12b and 12c in the horizontal direction (in FIG. 2) is set to be slightly smaller than the diagonal of the mounting hole P1.

The base portion 11 has urging pieces 13 and 14 projecting outwardly downwardly from the free end of the respective rectangular side portions 11b and 11c.

The rectangular side portions 11b and 11c of the base portion 11 are provided on the side opposite the lock portion 12 with respective holding arm pairs each consisting of holding arm portions 15 and 16 facing each other and having the same width as the base portion 11. The pair of holding arm portions 15 and 16 are formed on the facing sides with respective receiving recesses 15a and 16a having a substantially semi-circular sectional profile. The upper portions of the facing surfaces of the holding arm portions 15 and 16 are flared toward the top so that a rod R can be readily fitted in the receiving recesses 15a and 16b from above. The receiving recesses 15a and 16b terminate at the lower end in a U-shaped slit 17 extending in the width direction to facilitate the flexing of the holding arm portions 15 and 16 at the time of the insertion of the rod R.

A plurality of axial ribs 15c and 16c are provided on the surfaces of the receiving recesses 15a and 16a.

The holding arm portions 15 and 16 are provided at the top (in FIG. 2) with a loop-like damper, which consists of U-shaped halves 18a and 18b respectively consisting of linear portions 18a' and 18b' and semi-circular engagement portions 18a'' and 18b''.

The base portion 11 is provided on one side with a reinforcement rib 19 and also on the other side except for portions corresponding to the holding arm portions 15 and 16 with a reinforcement rib 20.

The operation of the embodiment will now be described.

Figure 4A:
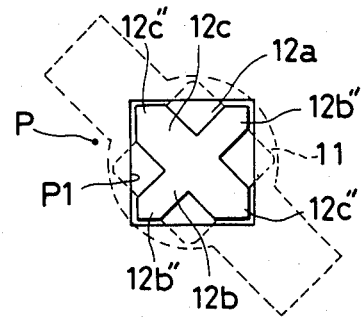
FIG. 4(A) is a view for explaining a state with a lock portion of the holding device inserted in a mounting hole.
Figure 4B:
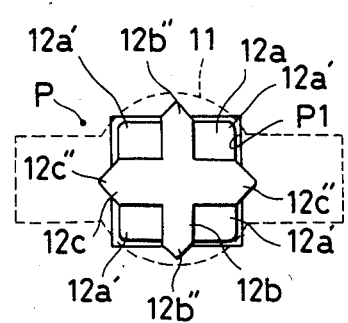
FIG. 4(B) is a view for explaining a state with the lock portion locked with respect to the mounting hole.
Figure 5:
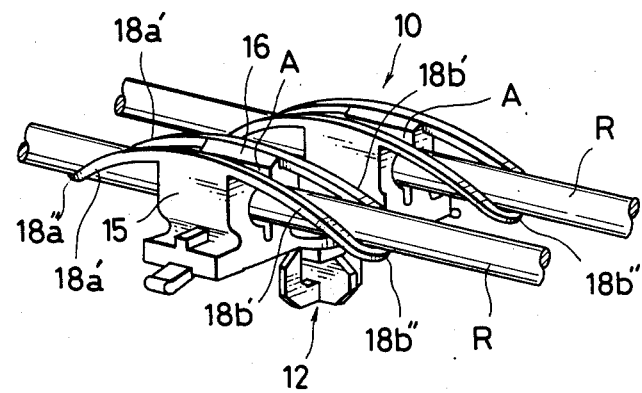
FIG. 5 is a perspective view showing the device shown in FIG. 2 in a state holding rod-like objects.

First, as shown in FIG. 4(A), the lock portion of the holding device 10 is inserted in the mounting hole P1 of the door inner panel P with the crossing lock portions 12b and 12c oriented in the directions of diagonals of the mounting hole P1, and then the device 10 is turned by substantially 45 degrees, as shown in FIG. 4(B). As a result, the projecting portions 12b'' and 12c'' of the crossing lock portions 12b and 12c are engaged with the surface of the door inner panel P adjacent to the edges of the mounting hole P1, and the plate-like stem portion 12a is inserted in the mounting hole P1 with a certain amount of play defined between the edges of the hole P1 and the stem portion 12a. Further, at this time the urging pieces 13 and 14 projecting from the opposite ends of the base portion 11 are urged by the door inner panel P and flexed toward the horizontal direction. Thus, the holding device 10 is mounted in the door inner panel P such that the corners 12a' of the plate-like stem portion 12a are rotatable over a range defined by the edges of the mounting hole P1 of the door inner panel P.

Afterwards, the rod R is set in the gap A between the ends of facing holding arm portions 15 and 16 of each pair and between the linear portions 18a' and 18b' of the damper and, in this state, is pushed toward the base portion 11. As a result, the flared surfaces 15b and 16b are forced apart by the rod R, that is, the holding arm portions 15 and 16 are outwardly flexed about the slit 17. The gap A and also the distance between the facing linear portions 18a', 18a' and 18b', 18b' are increased.

In consequence, the rod R is engaged in the semi-circular engagement portions 18a'' and 18b'' and clears the gap A to be received in the receiving recesses 15a and 16a and engaged with the axial ribs 15c and 16c while deforming the damper toward the base portion 11.

In this way, the rod R is held clamped by the axial ribs 15c and 16c in the receiving recesses 15a and 16a of the holding arm portions 15 and 16, and is supported by the elastic restoring force of the damper in such a state that it receives forces provided by the engagement portions 18a'' and 18b'' in a direction away from the base portion 11.

The rod R thus is supported at three points in the lengthwise direction, i.e., by the engagement portion 18a'', the holding arm portions 15 and 16 and the engagement portion 18b''. In other words, it is firmly supported with respect to vibration in the direction perpendicular to the door inner panel P. The three-point support is effective in the direction perpendicular to the lengthwise direction of the rod R, so that the rod R can be moved easily in the lengthwise direction. In other words, the rod R can be moved in the lengthwise direction and also moved angularly so as to be rotated in the mounting hole P1 of the holding device in accordance with the operation of the door handle or lock knob.

Figure 6:
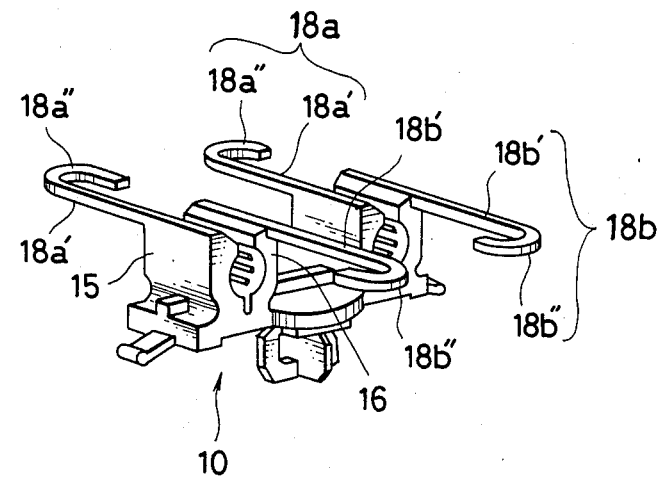
FIG. 6 is a perspective view showing a different embodiment of the device for holding a rod-like object according to the invention.
Figure 7:
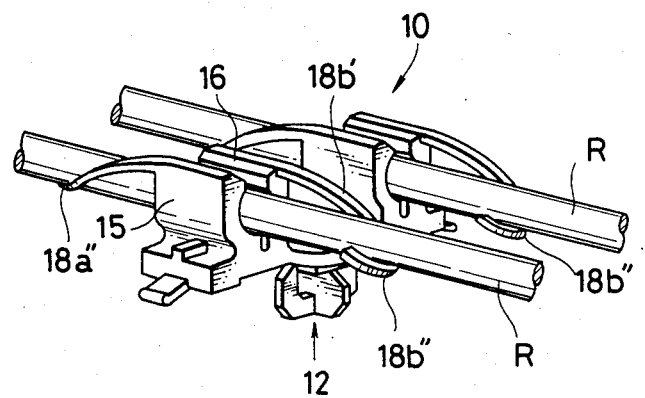
FIG. 7 is a perspective view showing the device shown in FIG. 6 in a state holding rod-like objects.

FIG. 6 shows a different embodiment of the device for holding a rod-like object according to the invention. In this embodiment, the damper consists of halves 18a and 18b respectively consisting of linear portions 18a' and 18b' extending in opposite directions from respective paired holding arm portions 15 and 16 and semi-circular engagement portions 18a'' and 18b'' extending from the linear portions 18a' and 18b'. Thus, as shown in FIG. 7, the engagement portions 18a'' and 18b'' engage with the rod R with elastic restoring force, so that the rod R is firmly supported with respect to vibration in the perpendicular direction as in the preceding embodiment.

While two preferred embodiments of the device for holding a rod-like object according to the invention have been described in the foregoing, these are by no means limitative. For example, the lock portion 12 may have other shapes, e.g., an anchor-type or a spearhead-type, as is well known in the art. Further, the engagement portion of the halves 18a and 18b of the damper may be polygonal instead of semi-circular. Further, it may be semi-cylindrical. Further, it is possible to provide a damper on only one of the paired holding arm portions.

Furthermore, while the above embodiments relate to the case of holding a rod R of an automobile door lock mechanism, the invention is also applicable to the case of holding various other rod-like objects.

As has been described in the foregoing, with the device for holding a rod-like object according to the invention the rod-like object is supported by both the holding arm portions and the damper extending therefrom, and the supporting forces provided by the holding arm portions and damper are substantially perpendicular to the direction of the length of the rod-like object. Thus, it is possible to eliminate rattling noise due to vibration while slidably holding the rod-like object.

What is claimed is:

1. A device for retaining and guiding a rod-like object comprising: a base portion; a lock portion projecting from one side of said base portion; a holding arm section projecting from an opposite side of said base portion and having a receiving recess for receiving a rod-like object therein inserted in a direction substantially perpendicular to the lengthwise direction of said rod-like object and for retaining said rod-like object sufficiently loosely to permit longitudinal motion; and a damper having canter levered arms laterally extending from a free end of said holding arm section in the direction of the longitudinal axis of said rod-like object and having an engagement portion provided at the free end thereof for engaging with the rod-like object received in said holding arm section with an elastic restoring force in the direction opposite to the direction of insertion of said rod-like object.

2. A device for retaining and guiding a rod-like object comprising: a base portion; a lock portion projecting from one side of said base portion; a holding arm section comprising opposing arm portions having free ends projecting from an opposite side of said base portion and defining a receiving recess therebetween for receiving and substantially encircling a rod-like object therein inserted between said free ends in a direction substantially perpendicular to the lengthwise direction of said rod-like object; and a relatively flexible damper element having canter levered arms extending outward from a free end of said holding arm section in the direction of the longitudinal axis of said rod-like object, and having an engagement portion provided at the free end thereon spaced laterally from said arm section for yieldably engaging a rod-like object retained in said holding arm section with sufficient elastic restoring force in the direction opposite to the direction of insertion of said rod-like object to prevent rattling of said rod-like object while still allowing vertical movement thereof.

3. The device according to claim 2, wherein said damper element has a straight finger-like portion having a length greater than a maximum transverse dimension of said rod-like object immediately adjacent to and integral with said holding arm section and an integral loop portion disposed at a distal end.

* * * * *